United States Patent
Tian et al.

(10) Patent No.: US 10,721,265 B2
(45) Date of Patent: Jul. 21, 2020

(54) USER DEVICE PROFILING USING INTEGRATED VIBRATION MECHANISM

(71) Applicant: PayPal, Inc., San Jose, CA (US)

(72) Inventors: Cheng Tian, San Jose, CA (US);
Braden Ericson, San Jose, CA (US);
Adhish N. Vyas, San Jose, CA (US);
Jennifer Esmeralda Delaney, Mountain View, CA (US)

(73) Assignee: PayPal, Inc., San Jose, CA (US)

( * ) Notice: Subject to any disclaimer, the term of this patent is extended or adjusted under 35 U.S.C. 154(b) by 368 days.

(21) Appl. No.: 15/610,160

(22) Filed: May 31, 2017

(65) Prior Publication Data

US 2018/0351994 A1 Dec. 6, 2018

(51) Int. Cl.
*H04L 29/06* (2006.01)
*H04M 1/215* (2006.01)
*G10L 17/04* (2013.01)

(52) U.S. Cl.
CPC ........ *H04L 63/1441* (2013.01); *H04L 63/102* (2013.01); *G10L 17/04* (2013.01); *H04M 1/2155* (2013.01)

(58) Field of Classification Search
CPC ........... G06F 21/552; G08B 3/10; H04S 7/30; H04M 1/2155; G10L 17/04

USPC .......................................................... 726/23
See application file for complete search history.

(56) References Cited

U.S. PATENT DOCUMENTS

| | | | | |
|---|---|---|---|---|
| 7,831,469 | B2* | 11/2010 | Bhakta | G06Q 30/02 705/14.1 |
| 10,074,364 | B1* | 9/2018 | Wightman | G10L 17/04 |
| 2009/0156202 | A1* | 6/2009 | Reiss | H04L 67/06 455/426.1 |
| 2010/0112991 | A1* | 5/2010 | Hannaby | H04M 1/2155 455/414.3 |
| 2010/0207721 | A1* | 8/2010 | Nakajima | G06F 21/552 340/5.3 |
| 2013/0179535 | A1* | 7/2013 | Baalu | H04S 7/30 709/217 |
| 2014/0278389 | A1* | 9/2014 | Zurek | G10L 15/20 704/231 |
| 2015/0033864 | A1* | 2/2015 | Kumar | G01N 29/265 73/636 |
| 2015/0063598 | A1* | 3/2015 | Shah | G08B 3/10 381/105 |

* cited by examiner

*Primary Examiner* — Bryan F Wright
(74) *Attorney, Agent, or Firm* — Haynes and Boone, LLP

(57) ABSTRACT

A system for user device profiling that includes operations such requesting an acoustic profile from a user device. Receiving the acoustic profile from the user device and comparing the received acoustic profile with a stored acoustic profile.

20 Claims, 5 Drawing Sheets

USER DEVICE PROFILING USING INTEGRATED VIBRATION MECHANISM

TECHNICAL FIELD

The present disclosure generally relates to device identification of devices using a vibration mechanism.

BACKGROUND

As mobile devices have become more prevalent, online service providers have developed multiple flows for obtaining the services. For example, a desktop website, a mobile website, and mobile application APIs. These additional flows provide ease of use and convenience to the users through flows tailored for the device being used, but also multiply the number of cyberattack v vulnerabilities that service providers are open to. Instead of just one set of vulnerabilities for one flow, there is a set of vulnerabilities for several flows. Criminals may find that attacking the mobile flows are easier as those flows are much newer designs that have not been tested as much as flows meant for desktops and likely have more vulnerabilities. Additionally, it is less computationally intensive to emulate a mobile device than a desktop computer. Thus, many criminals will attempt to conduct cyberattacks with multiple emulations of mobile devices.

It would be beneficial if there were ways to prevent cyberattacks through identification of unique signatures of a user device or determine whether a mobile device is an emulation.

Figure 1:
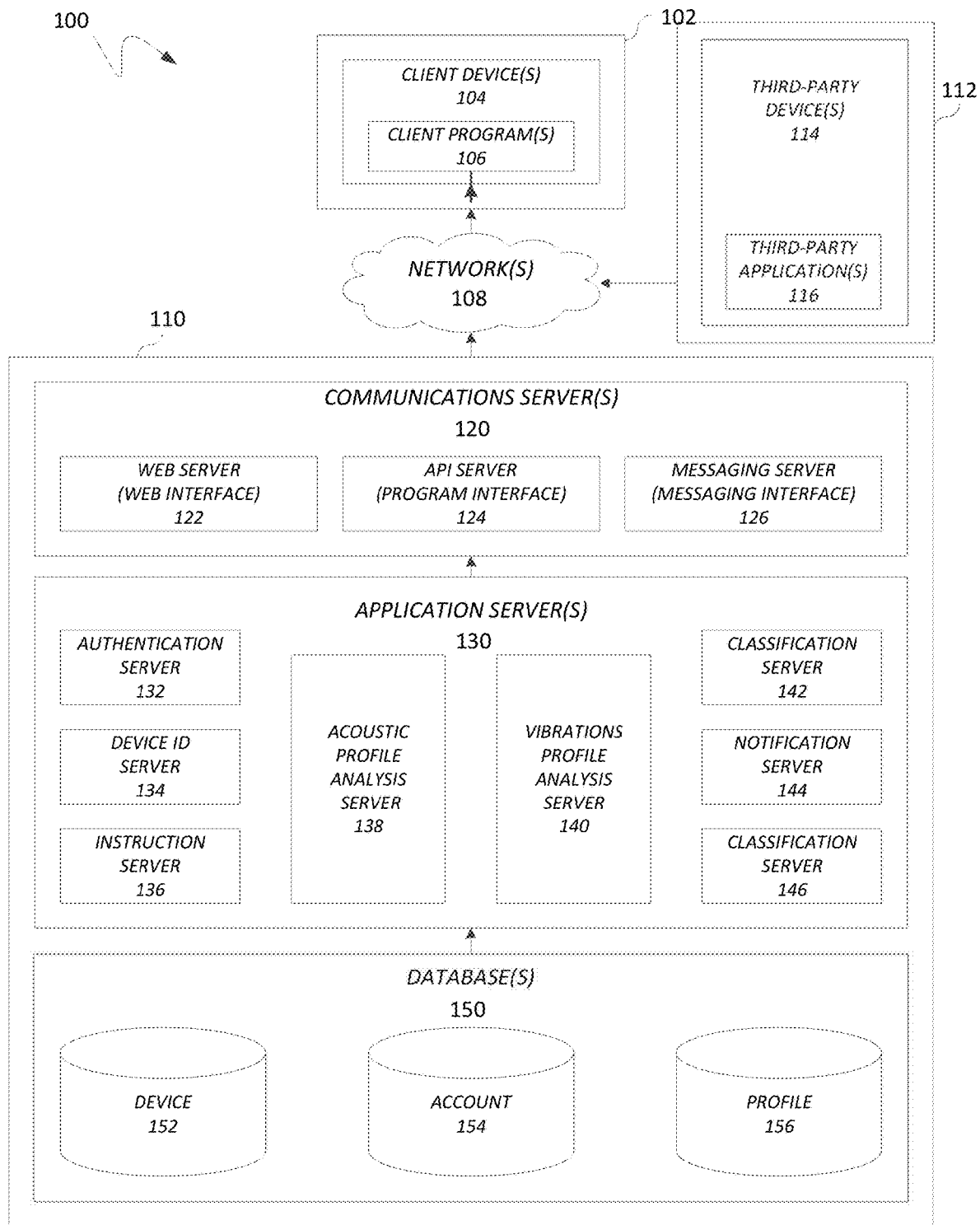
FIG. 1 is a block diagram of an example computing system that is adapted for identifying user devices using a vibration mechanism.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some examples, a system and method for a device, such as a server, is provided to determine whether a request received from a user device over a network connection is safe. In some examples, the system may request information from the user device. In some examples, the system will request the user device to provide information about the device. For example, the system may request information such as model type, name, number, manufacturing numbers, serial numbers, mac addresses, device versions, and/or the like. In some examples, the system may also request information such as username or other user identifiers such as name, address, biometric identifiers, confirmation of user identities (e.g. Touch ID® confirmations), and/or the like. In some examples, instead of requesting this information, this information may be provided by the user device as part the original request received from the user device.

In some examples, the system may cause a user device to execute instructions to perform one or more operations. In some examples, the instructions may be provided by the system. In some examples, the instructions may be held on the device, such as instructions on an installed application. In some examples, the instruction may cause the user device to perform one or more actions, such as enabling, actuating, or turning on a vibrator of the user device. Some example vibrators include but at not limited to eccentric rotating mass motors, linear actuators, and/or the like. In some examples, the vibrator may be a haptic feedback vibrator. In some examples, the vibrator may be a mechanical vibrator on the user device meant to alert a user, such as of a phone call, message, and/or the like. The instructions may include instructions or settings for the vibrator, such as the vibration pattern, the intensity of the vibration, the vibration frequency, voltage and/or current profile for driving the vibration mechanism, the voltage profile and/or current pattern for driving the vibration mechanism, and/or the like.

The instructions may also cause the user device to turn on or sense soundwaves using a microphone of the user device. The user device may record audio soundwaves while the vibrator on the user device is turned on. In this manner, the user device may record sounds from the user device caused by the vibrator.

In some examples, the user device may be instructed to display instructions to a user on how the user device should be held, where the user device should be placed, the orientation of the device, and/or the like. In the manner, the user may place the device in a manner such that the sound produced from turning the vibrator on the user device is consistent. For examples, the sounds produced by the user device when vibrating maybe be different when placed on a hard surface versus when on a soft surface or held by the hand. Furthermore, how the device is held by the hand may also affect the sound signature of the user device, In some examples, the system may convert the analogue sound signals that the microphone captures into a digital signal. The system may store the recorded sounds as an audio recording. The system may use one or more audio file formats to store the recordings such as MP3, vorbis, musepack, ACC, ATRAC, WMA, WAV, FLAC, AIFF, and/or the like. The instructions may also cause the user device to send the audio recording to the system.

In some examples, the system, may receive the audio recording from the user device and analyze the audio recording. The system may analyze the audio recordings to determine the whether the audio recordings are congruent with the identification information received or attributed to the user device. In some examples, the system may compare recordings. In some examples, the system may extract features of the recordings and compare them with features associated with the user device, such as amplitudes of different frequencies, the different frequencies recorded, impulse response, and/or the like.

Furthermore, the user device may provide other information about the device, such as accelerometer readings and gyroscope readings, which may be recorded during the vibration of the user device. This may allow the system to error correct in case the user device or the vibrator is performing differently than expected. For example, a vibrator may not be vibrating at the frequency or intensity as instructed.

The system, based on the analysis may determine whether the received recordings are fraudulent and/or whether the received recordings are congruent with the user device. In some examples, the recordings may be compared with other recordings, as there should not be two recordings that are identical. In some examples, the system may compress the recordings before comparing the recordings with other recordings to simplify the comparisons. For examples, the system may perform a hash on the received recording or part of the recording. To prevent spoofing through time delay of a recording, the system may hash portions of the recording based on audio features of the recording, such as one or more snippets of the audio recording surrounding an amplitude of a frequency in the recording.

The system may check to determine whether the recording is congruent with the user device. This may be based on comparing audio features of the recording with past recordings from the user device and whether enough features match within one or more standard deviations. In some examples a more complicated comparison may be conducted where certain features may be scored higher than others and/or the score may change depending on how close of a match the features are.

Based on a determination that the recording is not fraudulent and/or matches the device, the system may grant access to services and/or response to a request of the user device. Otherwise, the system may request additional authentication information, deny access, and/or deny a request. A more detailed description and additional embodiments are discussed in more detail below.

FIG. 1 illustrates, in block diagram format, an example embodiment of a computing system adapted for identifying user devices based on a vibration mechanism. As shown, a computing system 100 may comprise or implement a plurality of servers and/or software components that operate to perform various methodologies in accordance with the described embodiments. Example servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, electronic wearable device (e.g., smart watch, virtual reality headset), or other similar mobile devices that a user may carry on or about his or her person and access readily.

Client devices 104 may include a vibration mechanism for providing alerts or haptic feedback. For example, client devices 104 may include a vibration mechanism such as an eccentric rotating mass, linear actuators, and/or the like.

Client devices 104 generally may provide one or more client programs 106, such as system programs and application programs to perform various computing and/or communications operations. Example system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Example application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a web site, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

In various embodiments, computing system 100 may include, among other elements, a third party 112, which may comprise or employ third-party devices 114 hosting third-party applications 116. In various implementations, third-party devices 114 and/or third-party applications 116 may host applications associated with or employed by a third party 112. For example, third-party devices 114 and/or third-party applications 116 may enable network-based system 110 to provide client 102 and/or system 110 with additional services and/or information, such as merchant information, data communications, payment services, security functions, customer support, and/or other services, some of which will be discussed in greater detail below. Third-party devices 114 and/or third-party applications 116 may also provide system 110 and/or client 102 with other information and/or services, such as email services and/or information, property transfer and/or handling, purchase services and/or information, and/or other online services and/or information.

In one embodiment, third-party devices 114 may include one or more servers, such as a merchant server that manages merchant services, merchant sales, and/or the like. In some embodiments, the third-party devices may include a merchandise database that can provide information regarding different items and/or products for sale. In yet another embodiment, third-party severs 114 may include one or more servers for aggregating user data, user device data, and other statistics.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services, account management, fraud detection, risk management, monetary transfers, authentication, checkout processing, data gathering, data analysis, and other services to users that access network-based system 110. In various embodiments, client devices 104 and/or third-party devices 114 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, third-party devices 114, third-party applications 116, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 and/or a third-party application 116 comprising an implementation of API for network-based system 110.

Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 and/or third party 112 to the various services and functions provided by application servers 130.

Application servers 130 of network-based system 110 may be a server that provides various services to clients or third-parties including, but not limited to, fraud detection, user authentication, risk management, machine learning, checkout processing, and/or the like. Application server 130 of network-based system 110 may provide services to a third party merchants such as user authentication, device authentication, payment processing, and/or the like. Application servers 130 may include an authentication server 132, device identification server 134, instruction server 136, acoustic profile analysis server 138, vibration profile analysis server 140, classification server 142, notification server 144, and/or classification server 146. These servers, which may be in addition to other servers, may be structured and arranged to configure the system for classifying, identifying, and determining user devices based on vibration recordings.

Application servers 130, in turn, may be coupled to and capable of accessing one or more databases 150 including a classification device database 152, an account database 154, and/or profile database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
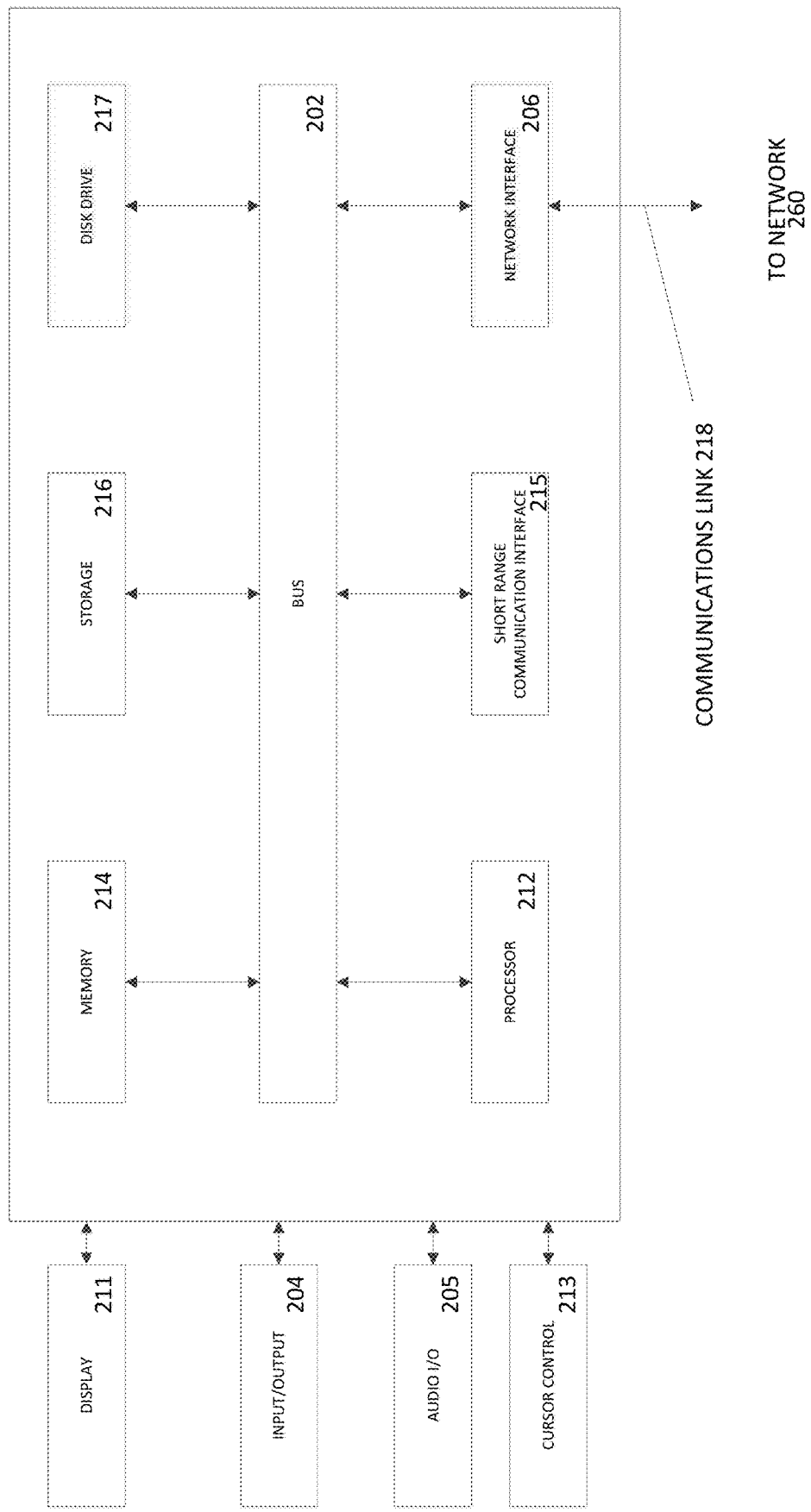
FIG. 2 is a block diagram of an example computer system suitable for implementing one or more devices of the system in FIG. 1.

FIG. 2 illustrates an example computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows.

Additionally, as more and more devices become communication capable, such as new smart devices using wireless communication to report, track, message, relay information and so forth, these devices may be part of computer system 200. For example, windows, walls, and other objects may double as touch screen devices for users to interact with. Such devices may be incorporated with the systems discussed herein.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touchscreen, etc.), alert mechanism such as a vibration mechanism. In some examples, I/O component may include a linear actuator or an eccentric rotating mass to provide alerts, haptic feedback, and/or the like. In some examples, I/O component 204 may include an image sensor for capturing images and/or video, such as a complementary metal oxide semiconductor (CMOS) image sensor, and/or the like. An audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, images, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
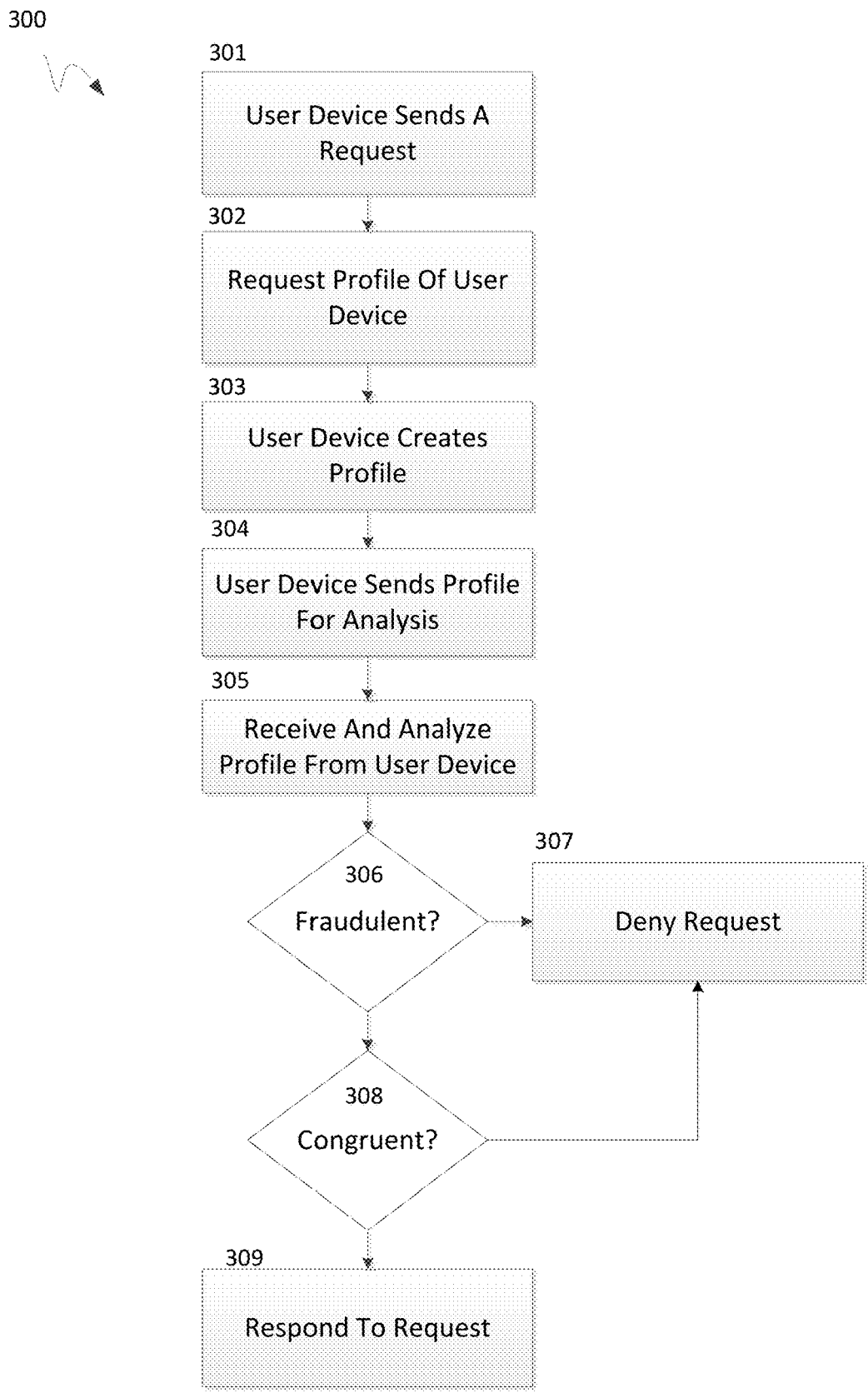
FIG. 3 is a flow diagram illustrating an example process for authenticating a user device through vibration analysis.

FIG. 3 illustrates an example process 300 that may be implemented by a system to authenticate a user device through vibration analysis. Process 300 may be implemented on a system such as system 100 of FIG. 1 according to some embodiments. According to some embodiments, process 300 may include one or more of operations 301-309, which may be implemented, at least in part, in the form of executable code stored on a non-transitory, tangible, machine readable media that, when run on one or more processors, may cause a system to perform one or more of the operations 301-309.

In some examples process 300 may include operation 301 wherein a user device requests for a service. The request may originate from an application on the user device such as a web application, payment application, gaming application, and/or the like. The request, in some examples, may be triggered based on a user input to the user device. In some examples, the request may be triggered through an interaction with another device through, such as an interaction with or detection of another device over a wireless signal, such as near field communications (NFC), Bluetooth®, and/or the like. In some examples the other device may be a POS device of a merchant, a computer, another user device, and/or the like.

In some examples the request for service may be for conducting a payment, access to content of a third party, a communication request, and/or the like. In some examples, the request may be sent over a network such as network 108 of FIG. 1 or other networks. In some examples, the request may be sent through an intermediary before reaching its final destination, for example a request may be relayed to a server of a payment provider through a merchant device that the user device communicates with. In some examples, the user device may be directly communicating with the device for which the request is for.

In some examples, the request may have information embedded in it. For example, a request made by a user device may be through an application installed on the user device, and the request may be meant to interact with a particular API. In some examples, the request may be a standardized request that is instructed by the application installed on the user device. For example, a payment provide may have provided a user with a payment application to be installed on the payment device such that the payment application can conduct payments on the user device. This payment application may have standard request that are meant to interact with an API associated with a payment provider. In some examples the application may be provided by a merchant, a payment provider, or another third-party service provider.

The request may be accompanied with additional information, such as device information, user information, and/or the like. In some examples, the application running on the user device may cause the user device to send the additional information. The additional information may include information such as, user name, device identification information, passwords, cookie information, application identification information, account information, and/or the like. In other examples, this information may be sent to a server or third-party device in response to a request.

In some examples, process 300 maybe include operation 302. At operation 302, the information sent from the user device may be received by another device, such as a merchant device or server device (hereinafter referenced as server for ease of reference), and in response to receiving the access request, the server may request from the user device a vibration profile of the user device, acoustic profile of the user device, or both. A vibration profile may be readings from one or more motion sensors, such as an accelerometer, gyroscope, and/or the like. An acoustic profile may be an audio recording.

In some examples, the server may send instructions on how the vibration profile and/or acoustic profiles are created. For example, the server may give specific settings and patterns for the vibration mechanism on the user device to perform. The instructions may include vibration frequency, the vibrating mechanism(s) used (e.g. the vibrator on the user device used for alerts, the vibrator for haptic feedback, etc.), length of the vibrations, number of vibrations, and the pattern to the vibrations. Patterns of vibrations may be a combination of one or more vibrating frequencies, vibrating intensities/amplitude, vibrating lengths, number of vibrations, and/or the like. The instructions may also cause the user device to capture the vibration profile by logging motion sensor readings during the user device performance of the vibration instructions and/or storing audio recordings during the performance of the vibration instructions. In some examples, the instructions on capturing the vibration profiles and/or how to create the vibration profiles may be stored on an application of the user device which the server may request. In this manner, the server does not have to repeatedly send instructions.

By having the server send instructions or request for the exact vibration settings to create the associated vibration profile and/or acoustic profile, it increases the difficulty for a nefarious user to spoof the vibration profile. There are infinite different patterns that can be instructed to the user device, therefore, having a prerecorded vibration profile to fake performance of the instructions would be difficult. Thus, as one possible check for whether a user device is actually a mobile device, the server can check whether the vibration profile and/or acoustic profile follow the instructed pattern. For example, if an S.O.S. type pattern was given (three short and three long vibrations) and the pattern received from the user device did not follow that pattern, the server can presume that the user device is emulating a mobile device rather than actually being a mobile device. Additionally, different devices use different mechanisms to cause vibrations. For example, some devices use linear actuators, some devices use eccentric rotating mass motors, and/or the like. Thus, vibrations will have different profiles depending on the type of mechanism used.

Process 300 may include operation 303. At operation 303, the user device may receive the vibration profile and/or acoustic profile request from the server, and create a vibration profile and/or acoustic profile in response. The user device, may implement the settings and instructions received through a vibrating mechanism associated with the user device (e.g. vibrator of a mobile phone). For examples, the user device may cause the vibrator of the user device to vibrate at the intensity, length of time, frequency, and/or pattern as instructed by the server. Additionally, the user device may log accelerometer readings and/or turn on an acoustic sensor (e.g. a microphone) of the user device to record the sounds caused by the vibrating mechanism. Furthermore, to control for environmental changes, the user device may display instructions on how to place, hold, and/or position the user device during the capture of the vibration profile and/or acoustic profile.

Process 300 may include operation 304. At operation 304, the user device may send the vibration profile and/or acoustic profile recorded at operation 303 and send it to the server for analysis. In some examples, the user device may compress the recordings before sending the recordings to the server. Furthermore, the user device may send additional information associated with the device, such as username, passwords, device identifiers, user identifiers, location information, and/or the like. In some examples, the device and user identifiers may be sent in operation 304 rather than in operation 301 discussed above.

Process 300 may include operation 305. At operation 305, the server may receive the recordings and any additional information sent from the user device, and analyze the received recordings to determine whether the recordings are congruent with the user device. As discussed in more detail below, the server may analyze the recordings to determine whether the recordings match the vibration pattern instructed in operation 302 match the vibration patterns indicated by the recordings. For example, the sound recording should show a sound patterns that match the vibration pattern. Similarly, the motion sensors should show movement sensed indicative of the vibration pattern.

Additionally, the system may check to see if any of the received recordings are prerecording's by checking to see if the recordings have been received before. In some examples, the system may compare recordings or do a search based on the recording to see if it matches a database of past recordings used. Generally, no two recordings should be identical. Checking for matches of each recording may be time consuming and/or resource intensive. As such, the server may process the recordings such that analysis is quicker, uses less resources, and/or is smaller for archiving. For example, the system may hash a portion of the recording and compare it with other stored hashed recordings for a match. Furthermore, the server may retain portions of the recordings rather than the entire recording. For example, the server may create a hash of an audio recording clip wherein the clip is delimited by one or more predetermined time periods before and after a certain feature of the audio recording. In one example, the server may select a clip that is half a second before and after the highest amplitude for a particular frequency in the audio recording for conducting a hash. In this manner, resources are saved by not having to maintain the entire recording, and the hash reduces the size even more. This allows for the server to determine whether the recording is a duplicate.

Process 300 may include operation 306. At operation 306, the server may determine whether the received recording is a fraudulent, fake, and/or prior used recording. In the case that the server does determine that the recording is a fraudulent, fake, and/or prior used recording, the system may continue to operation 307 wherein the user device request for access or service is denied and/or additional authentication is requested (e.g. username, password, two factor authentication, email authentication, and/or the like). In some examples, if the user device provides correct additional authentication information, the server may update the profile associated with the user device in the database with the received profile.

If the server determines that the recording is not fraudulent, fake, and/or prior used recording, the server may continue to operation 308 wherein the server may determine whether the recording is congruent with the user device. For example, the server may compare the recordings with other recordings associated with the user device, which may be identified based on the device information received in one or more of the other operations discussed above. Determining congruence of the recordings and the user device is discussed in more detail below. If the server determines that the recordings are not congruent with the user device, the server may continue to operation 307. If the server determines that the recordings are congruent with expected recordings for the user device and not fraudulent, fake, and/or a prior used recording, the server may continue to operation 309 wherein the server may response to the request or allow access to one or more services by the server.

Figure 4:
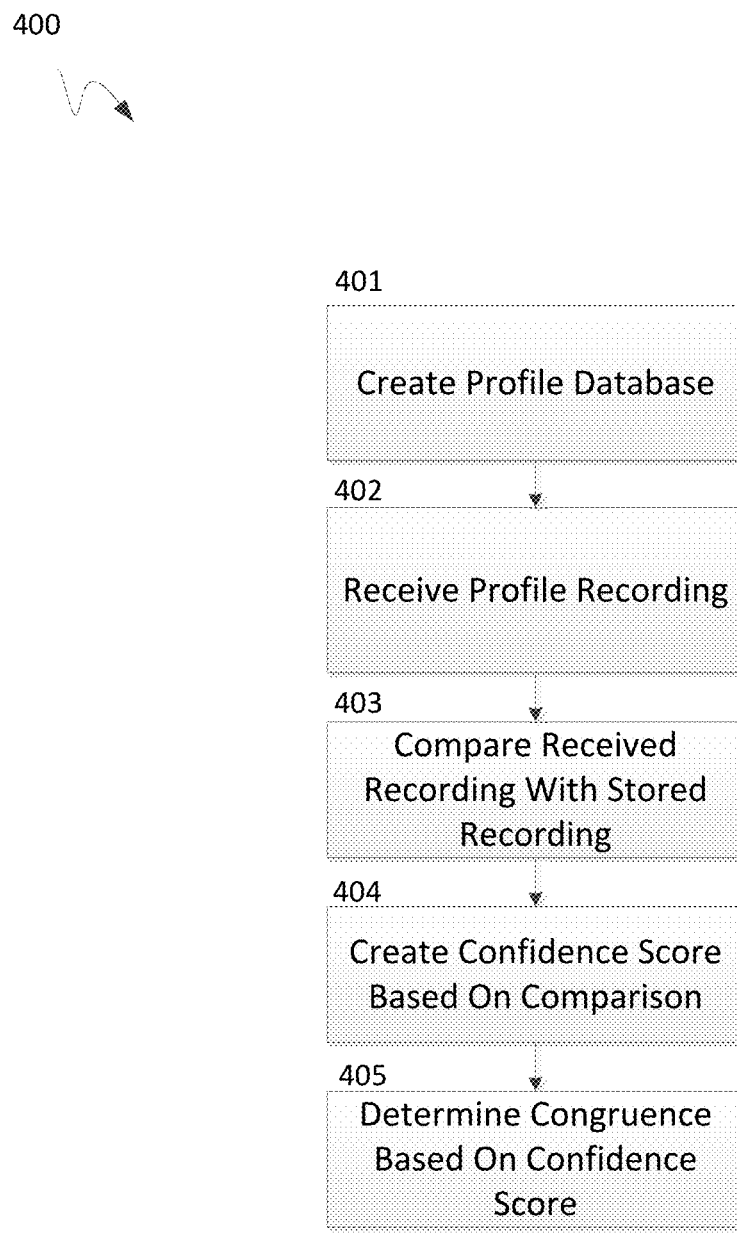
FIG. 4 is a flow diagram illustrating an example process for determining whether an acoustic or vibration profile recording is congruent with a user device.

FIG. 4 illustrates an example process 400 that may be implemented by a system to determine whether a receive acoustic profile recording and/or vibration profile recording is congruent with a user device. Process 400 may be implemented on a system such as system 100, client device 104, third-party device 112, network-based system 110 and/or the like according to some embodiments. In some examples process 400 or at least a part of process 400 may be implemented as part of operation 305 and/or 306 of FIG. 3. According to some embodiments, process 400 may include one or more of operations 401-405, which may be implemented, at least in part, in the form of executable code stored on a non-transitory, tangible, machine readable media that, when run on one or more processors, may cause a system to perform one or more of the operations 401-405.

In some examples, process 400 may include operation 401. At operation 401, the system may create a database of acoustic and/or vibration profiles for different types of mobile devices. In some examples, the acoustic and/or vibration profiles may be recordings from sensors, such as motion sensors, audio sensors, and/or the like. In some examples, the database may maintain features extracted from one or more recordings associated with acoustic and/or vibration profiles. By maintaining features, resources, such as database memory space may be used more efficiently as feature extractions take up less space than entire sensor recordings.

In some examples, the database may maintain one or more profiles for each individual device. For example, the system may collect profiles from the user device for storage in the database to later use as part of an authentication, such as process 300 discussed above. In some examples, the database may be a relational database that relates the profiles with certain information associated with the specific device and/or user, such as user information, device serial number, mac address, and/or other information that helps identify the user and/or user device.

In some examples, the device information, device acoustic profile, and/or vibration profile may be provided during an initial registration. The user device may send the information upon a request from a server. In some examples, as part of the request, the system may provide the user instructions on how the user device is held, placed, and/or the like. In this manner, differences in vibration and acoustic profiles due to the environment can be controlled. For example, having the phone held with two fingers during capture of the vibration or acoustic profile of a device using the vibrating mechanism would have less interference than if it is laying on a table or dampened while on a pillow. Furthermore, as discussed below, the system may request and/or receive new profiles or updates to address changes to the device, such as when a phone case is added to the device, which would alter its profiles.

In some examples, the user device may have an application installed that passively records and provides a server of the system vibration information from the user device periodically whenever the user device vibrates from regular use, such as vibration alerts for messages, phone calls, games, and/or the like. Passive collection, as will be discussed below, has the issue of uncontrolled environments, as such the system would have to maintain a larger database of profiles. In contrast, controlled environment collection would need much less as the profiles will have less deviations from each other.

In some examples, the system may collect profiles and/or features of profiles and create a database that relate to device models. In some examples, the system may relate profiles to device models instead of a specific user. In such an embodiment, the system would be ensuring that the device has an acoustic or vibration profile congruent with the identified device rather than a device of a specific user. Different device models will have different acoustic and vibration profiles, and would also be difficult to spoof or emulate. Vibration and/or acoustic profiles will be different for a device based on the vibrating mechanism used, the weight of the device, the shape of the device, the way components in the device are arranged, the size of the device, whether the device has a protective case, the material used to make the device, and/or the like.

Where applicable, the ordering of various operations described may be changed, combined into composite steps, and/or separated into sub-steps.

In some examples, process 400 may include operation 402. At operation 402, the system may receive a recording of an acoustic profile for a user device and/or vibration profile for a user device for authentication or verification. Additionally, the system may receive device and/or user information for identifying previously stored profiles and/or features associated with the user device, such as the information stored in the database in operation 401.

In some examples, process 400 may include operation 403. At operation 403, the system may conduct a comparison of the received profile with a profile (hereinafter profile refers to an acoustic profile, vibration profile, or both) stored in the database. For example, the system, using one or more identifiers, such as the username, device model name, and/or other identifiers discussed above, lookup one or more profiles or attributes corresponding and/or related to the identifier in the database created in operation 401. The system may then compare the received profile with the profile stored in the database. In some examples, the system may extract attributes from the profiles for comparison. For example, the system may compare frequencies in each of the profiles (in the case that the database stores attributes, the system may compare the extracted attribute to the attribute stored in the database).

In some examples, the system may conduct a transform, such as a Fourier transform, on the received and/or stored profile into the frequency domain for comparison. Other features that may be compared are amplitudes of the frequencies (e.g. amplitude of sound frequencies, amplitude of motion from motion sensors, and/or the like).

In some examples, the system may compare the wave form for certain features that are associated with different types of vibration mechanisms used. For example, the vibration pattern of an eccentric rotating mass has a different edge case at the start and end of a vibration pulse than a linear actuator, discussed in more detail below. Vibrations from a linear actuator are generally more consistent.

Another feature that the system may analyze are the frequency lags or differences between the voltage profile and/or setting used to drive the vibration mechanism of the user device and the frequencies recorded by the sensors for the profile. For example a large device may have a 0.1 Hz difference between the drive frequencies while a smaller device may have a 0.05 Hz difference.

Another example feature the system may analyze are the differences between the voltage used for driving the vibration mechanism and/or the amplitude of the sound or motion sensed by the sensors and recorded in the profiles. In some examples, the system may analyze the differences between the ramp up and ramp down time for the vibration mechanism as sensed by the motion sensor and/or microphone of the user device.

In some examples, the system may compare the features discussed above with the features of the stored profiles to determine their differences. The system may determine an average difference over several other comparisons and determine how far off of a standard deviation the features of the received profile are to the recorded profile. In some examples, the system may use a threshold value, such as one or two standard deviations, to create a binary determination as to whether the features match.

In some examples, the system may score how much the features match and combine the scores to determine whether the received profiles are congruent with the stored profiles.

Additionally, the system may analyze the received profile to determine whether it followed the correct instructions or has the pattern as instructed by the system or other device. For example, if the instruction was to collect a profile using an S.O.S. vibration pattern, the system would check to make sure that the received profile conforms to the S.O.S. vibration pattern. The system may analyze for other features that may have been in the instructions, such as the changes in frequency, the existence of certain frequencies, changes of frequencies in a specified pattern, changes in amplitude, and/or the like.

In some examples, such as in cases where the stored profiles correspond specifically to the user and/or specific user device, the system may compare the received profile with the stored profiles corresponding to the device and determine how different the profiles are. The system may determine whether the difference is beyond an average difference, such as one or more standard deviations from an average difference. The average difference may be based on other comparisons made with other devices and/or the user device. In some examples, the system may compare snippets. In some examples the snippets may be taken based on certain features such as certain frequencies and/or amplitudes.

In some examples, such as in cases whether the stored profiles correspond to a particular model or phone type, the system may conduct a comparison of the received profiles with profiles corresponding to the device model. The model of the device may be determined from the information provided, such as the manufacturing serial number. In some examples, a user may have specified the model type of the device during a registration or installation of an application and provided that information.

In some examples, the database may store one or more sample profiles for each specific device model that were created in a controlled environment for comparison. The system may then compare the received profiles with the stored profiles corresponding to the identified device in a similar manner as discussed above.

In some examples, the database may have collected many different profiles from many devices of the same model from different users and stored them. This could be with uncontrolled environments, such that sometimes the phone may have been resting on a pillow, on a table, held in the hand, in a carrying case, connected to an extra battery, and/or the like. These factors may change the profiles. They system may compare or analyze the plurality of profiles for commonalities. In some examples, the system may use a neural network to identify features that are common to the profiles of a specific model by inputting a plurality of profiles for a plurality of device models and identifying one or more neuron responses in combination or alone from the neural network that identify each specific model.

Process 400 may include operation 404. At operation 404 the system may use one or more factors determined at operation 403 (e.g. standard deviation from the average, existence of one or more similar features, and/or the like) to create a confidence score. Each of the factors may have a weight value, which can be normalized and/or combined to develop a confidence score.

Process 400 may include operation 405. At operation 405, the system may determine, based on the confidence score, whether the received profile is congruent with the device or an emulation. In some examples, there may be a threshold value that if the confidence score exceeds or crosses, would cause the system to determine that the user device is an emulation.

Figure 5:
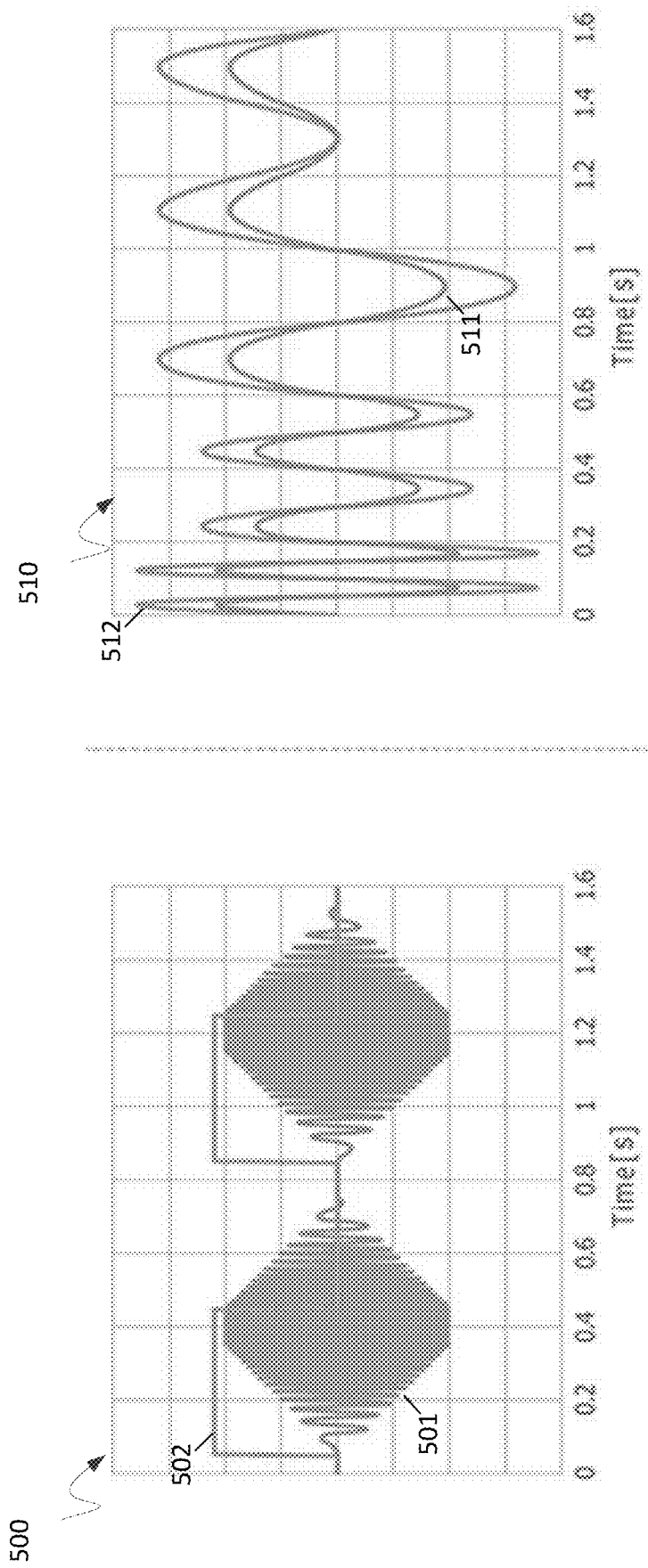
FIG. 5 illustrates example graphs of vibration responses superimposed with a voltage drive to visualize different features of vibrations a device may have.

FIG. 5 illustrates graph 500 for an eccentric rotating mass vibration mechanism and graph 510 for a linear actuator to visualize features that process 300 and 400 of FIGS. 3 and 4 may be able to use for differentiating and/or identifying devices. As shown, vibration graph 500 super imposes vibration profile 501 over the drive voltage 502 to drive the vibration mechanism over time. As shown the eccentric rotating mass has a ramp up and ramp down pattern in vibration profile 501 in comparison to step function pattern of drive voltage 502. In contrast, the linear actuator has a vibration profile 511 that mirrors the drive voltage 512. Due to the precision of a linear actuator versus an eccentric rotating mass, a system could differentiate or devices based on these types of patterns. There may also be differences between types of linear actuators, such as the difference in the peaks of the drive voltage amplitudes in comparison to the peak amplitudes of the linear actuators. Additional differences may be delay time between the patterns (e.g. time between peak amplitude of the voltage profile versus the vibration profile).

Additionally, there would be additional differences based on the device weight, configuration, and location of the vibration mechanism in the device which may affect the frequency of the vibration in comparison to the voltage applied. For example, a larger device may have a lower frequency vibration profile in comparison to the voltage profile than a smaller lighter device would. Additionally, depending on the location of the vibration mechanism, the amplitude of a vibration may be increased in one direction over another. These different features may help determine whether the vibration profile received matches what should happen for an identified device, helping the system identify whether a receive vibration profile is real, fake, and/or congruent with the user device identified. These principles also apply to the acoustic profile, which may be captured by a microphone of the device. The sounds created through the vibrations may have different frequencies based on the size and mass of the device, the location of the vibrating mechanism, the voltage profile used to actuate the vibration mechanism, the location of the microphone, and/or the like.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have discussed capturing vibration profiles using certain sensors, such as an accelerometer or microphone, however, as technology gets better additional sensors may be used to capture the vibration profile. Additionally, certain vibration mechanisms were discussed above which are popular for causing a device to vibrate, however, different technologies may be used in the future to allow for alerts or cause a device to provide certain acoustic profiles and/or vibration profiles. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory storing instructions; and
   one or more hardware processors coupled to the non-transitory memory and configured to read the instructions from the non-transitory memory to cause the system to perform operations comprising:
   receiving an access request from a user device, wherein the access request is a request for access to an application service provided by the system;
   requesting, from the user device, device identification information of the user device;
   receiving the device identification information from the user device;
   based on the device identification information, identifying a stored acoustic profile that corresponds to the device identification information;
   requesting an acoustic profile from the user device;
   receiving the acoustic profile from the user device;
   comparing the acoustic profile received from the user device with the stored acoustic profile that corresponds to the device identification information of the user device to determine a confidence score indicative of a match between the acoustic profile received from the user device and the stored acoustic profile; and
   granting the access request to the application service based at least in part on the confidence score indicative of the match between the acoustic profile received from the user device and the stored acoustic profile.

2. The system of claim 1, wherein the stored acoustic profile is identified from a plurality of stored acoustic profiles based at least in part on the device identification information.

3. The system of claim 1, wherein the stored acoustic profile is identified from a plurality of stored acoustic profiles based at least in part on an account associated with the user device.

4. The system of claim 1, wherein the stored acoustic profile was received from the user device as part of a registration with the system.

5. The system of claim 1, wherein the acoustic profile comprises accelerometer readings.

6. The system of claim 1, wherein the acoustic profile comprises sound recordings.

7. The system of claim 1, wherein the requesting the acoustic profile comprises sending, to the user device, instructions on capturing the acoustic profile.

8. A computer implemented method, comprising:
   receiving an access request from a user device, wherein the access request is for access to an application service;
   requesting, from the user device, device identification information of the user device;
   receiving the device identification information from the user device;
   based on the device identification information, selecting a stored acoustic profile that corresponds to the device identification information;
   requesting an acoustic profile from the user device;
   receiving the acoustic profile from the user device;
   comparing the acoustic profile received from the user device with the stored acoustic profile that corresponds to the device identification information of the user device to determine a confidence score indicative of a match between the acoustic profile and the stored acoustic profile; and
   granting the access request to the application service based at least in part on the confidence score.

9. The method of claim 8, wherein the requesting the acoustic profile comprises sending, to the user device, instructions on capturing the acoustic profile.

10. The method of claim 8, wherein the acoustic profile comprises a vibration pattern of a vibration motor of the user device.

11. The method of claim 10, wherein the vibration pattern is an impulse.

12. The method of claim 10, wherein the vibration pattern is a plurality of impulses.

13. The method of claim 12, wherein each of the plurality of impulses has a different duration.

14. The method of claim 12, wherein each of the plurality of impulses has a different frequency.

15. The method of claim 8, further comprising compressing the acoustic profile received from the user device.

16. A non-transitory computer-readable medium having stored thereon instructions executable by a computer to cause the computer to perform operations comprising:
- receiving an access request from a user device, wherein the access request is a request for access to an application service provided by one or more servers;
- requesting, from the user device, device identification information of the user device;
- receiving the device identifier information from the user device;
- based on the device identification information, identifying a stored acoustic profile that corresponds to the device identification information;
- requesting an acoustic profile from the user device;
- receiving the acoustic profile from the user device;
- comparing the acoustic profile received from the user device with the stored acoustic profile that corresponds to the device identification information of the user device to determine a confidence score indicative of a match between the acoustic profile and the stored acoustic profile; and
- granting the access request to the application service based at least in part on the confidence score indicative of the match between the acoustic profile received from the user device and the stored acoustic profile.

17. The non-transitory computer-readable medium of claim 16, wherein the requesting the acoustic profile comprises sending, to the user device, instructions on capturing the acoustic profile.

18. The non-transitory computer-readable medium of claim 16, wherein the acoustic profile is a vibration pattern that includes an impulse.

19. The non-transitory computer-readable medium of claim 16, wherein the acoustic profile is a vibration pattern that includes a plurality of impulses respectively having a plurality of frequencies.

20. The system of claim 1, wherein the acoustic profile comprises an audio recording of a vibration pattern of a vibrator device of the user device.

* * * * *